United States Patent
Robare

(10) Patent No.: US 6,601,073 B1
(45) Date of Patent: Jul. 29, 2003

(54) DEDUCTIVE DATABASE ARCHITECTURE FOR GEOGRAPHIC DATA

(75) Inventor: Philip Robare, Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/532,617

(22) Filed: Mar. 22, 2000

(51) Int. Cl.⁷ .................. G06F 17/30; G01C 21/00; G08G 1/123
(52) U.S. Cl. ............... 707/104; 707/102; 701/202; 701/208; 701/209; 701/210; 340/995
(58) Field of Search ............... 707/104, 102, 707/200, 100; 342/357.13; 701/202, 208, 209, 210; 340/995

(56) References Cited

U.S. PATENT DOCUMENTS

| | | | |
|---|---|---|---|
| 6,047,280 A | | 4/2000 | Ashby et al. |
| 6,208,934 B1 | * | 3/2001 | Bechtolsheim et al. ..... 701/209 |
| 6,212,472 B1 | * | 4/2001 | Nonaka et al. ............ 701/208 |
| 6,240,361 B1 | * | 5/2001 | Ise et al. ..................... 701/208 |
| 6,249,742 B1 | * | 6/2001 | Friederich et al. .......... 701/202 |
| 6,278,942 B1 | * | 8/2001 | McDonough ............... 701/210 |
| 6,282,492 B1 | * | 8/2001 | Gorai et al. ................. 701/209 |
| 6,292,745 B1 | * | 9/2001 | Robare ....................... 701/208 |
| 6,308,177 B1 | * | 10/2001 | Israni et al. ................ 707/100 |
| 6,313,761 B1 | * | 11/2001 | Shinada ...................... 340/995 |
| 6,314,367 B1 | * | 11/2001 | Ohler et al. ................ 701/208 |
| 6,317,753 B1 | * | 11/2001 | McGrath et al. ............ 707/200 |
| 6,362,779 B1 | * | 3/2002 | Meek et al. ........... 342/357.13 |
| 6,370,539 B1 | * | 4/2002 | Ashby et al. ............... 707/102 |
| 6,381,537 B1 | * | 4/2002 | Chenault et al. ............ 701/209 |

* cited by examiner

*Primary Examiner*—Frantz Coby
(74) *Attorney, Agent, or Firm*—Frank J. Kozak; Jon D. Shutter; Lawrence M. Kaplan

(57) ABSTRACT

A database architecture for using geographic data to provide navigation-related functions is disclosed. The navigation-related functions are provided by navigation program applications. A geographic database is stored on a medium and includes data representing geographic features and has a plurality of indexes into the data. A data access layer accepts requests from the navigation program applications for geographically-referenced data, accesses the geographic database and provides responses to the requests from the navigation program applications for geographically-referenced data. Logic rules are associated with the geographic database. The data access layer includes a deductive database engine that accesses and combines the logic rules to determine how to use to the indexes to access the data from the medium and to convert the data from a format in which they are stored on the medium into a format that the navigation program applications can use. The database architecture can be used in vehicle navigation systems including navigation systems that use data obtained via a wireless communications link from an off-board data supplier.

19 Claims, 11 Drawing Sheets

DEDUCTIVE DATABASE ARCHITECTURE FOR GEOGRAPHIC DATA

BACKGROUND OF THE INVENTION

The present invention relates to a database architecture for geographic data and, more particularly, the present invention relates to a deductive database architecture for geographic data used in a navigation system or by a navigation application.

Navigation systems are provided on various computer platforms. In some navigation systems, navigation applications and hardware are combined into a single unit. Such single unit systems may be installed in vehicles or may be carried by persons. Navigation applications are also available for general purpose computer platforms, such as personal computers, personal digital assistants, PalmPilot®-type devices, and so on.

Navigation systems and navigation applications provide a variety of useful navigation-related features and services. For example, navigation systems installed in vehicles can provide detailed instructions for driving to desired destinations thereby reducing travel times and expenses. Navigation systems and navigation applications can also search for businesses of a desired type and provide routing guidance to locations of such businesses. Navigation systems and navigation applications can also incorporate real-time traffic information. Navigation systems and applications may also be used by operators of vehicle fleets, such as trucking companies, package delivery services, and so on.

In order to provide various kinds of useful features, navigation systems and applications use geographic data. One consideration associated with providing geographic data for navigation systems and applications is that geographic data become out-of-date. For example, new roads are built, businesses change locations, road construction closes roads, detours are established, museum and restaurant hours change, etc. It is expected that end users, such as vehicle owners who have navigation systems in their vehicles, will want to have the geographic data in their navigation systems updated from time to time.

A consideration related to providing up-to-date data for navigation systems is the proliferation of different, incompatible navigation system platforms. In order to provide updated geographic data for an end user's navigation system over the lifetime of the navigation system, the provider of geographic data needs to provide a product that not only has updated geographic data, but also that is compatible with the end user's particular navigation system platform. Over the expected lifetime of navigation systems, which may be ten years or more, this would require supporting a growing number of old, incompatible navigation systems and platforms. If specialized versions of updated geographic data products had to be produced for each separate, different type or version of navigation platform, the number of different products would continue to increase over time thereby making the provision of updated geographic data products to end users difficult and expensive.

Another problem associated with providing navigation-related services with a navigation system or navigation application is integration of different types of data with geographic data. For example, a person may want to make reservations for dinner and see a movie. It is envisioned that a navigation system could include a feature to automatically make reservations at a restaurant of a desired type, obtain tickets for the movie, and provide driving instructions for traveling to the restaurant, then to the theater, and then back home, taking into account the availability of reservations at restaurants of the desired type, the show times of the movie at various theaters, and travel times between the person's location, the locations of the restaurants of the desired type and the locations of the various theaters. In order to provide this kind of feature, a means is required to combine the geographic data about the locations of the restaurants and theaters, data about travel times on the road network, data about the restaurant reservations, and data about movie show times and reservations.

Accordingly, there exists a need for a way to provide for updating a geographic database used in a navigation system.

There also exists a need for a way to integrate different types of data with geographic data contained in a geographic database.

SUMMARY OF THE INVENTION

To address these and other objectives, the present invention comprises a database architecture for using geographic data to provide navigation-related functions. The navigation-related functions are provided by navigation program applications. A geographic database is stored on a medium and includes data representing geographic features and has a plurality of indexes into the data. A data access layer accepts requests from the navigation program applications for geographically-referenced data, accesses the geographic database and provides responses to the requests from the navigation program applications for data including geographically-referenced data and non-spatially referenced data such as list of streets names, city names, etc. Logic rules are associated with the geographic database. The data access layer includes a deductive database engine that accesses and combines the logic rules to determine how to use to the indexes to access the data from the medium and to convert the data from a format in which they are stored on the medium into a format that the navigation program applications can use. The database architecture can be used in vehicle navigation systems including navigation systems that use data obtained via wireless communications links from off-board data suppliers.

DETAILED DESCRIPTION OF THE PRESENTLY PREFERRED EMBODIMENTS

I. Navigation System—Overview

For purposes of this disclosure, a "navigation system" is understood to include a system installed in a vehicle (i.e., an in-vehicle navigation system). A "navigation system" also includes any software application installed on a computer platform that provides navigation-related features and that uses geographic data, including applications that are installed on personal computers, networks, personal digital assistants, portable electronic devices, and so on.

Embodiments of the present invention apply principles of semantic database analysis and logical query engine design to the field of spatial databases. A semantic database (also referred to as a "deductive database") defines sets of data and logic statements that are tied together in a network structure. In order to satisfy a query, a deductive database engine searches the network through the logic connections to find data elements that will satisfy the query. The actual reading (of data) is controlled by low level predicates which are simple rules that evaluate to either true or false. These low level predicates in turn call C functions. A predicate that evaluates to false returns no data or is inapplicable. A predicate that evaluates to true can return a single value or an entire row.

Figure 1:
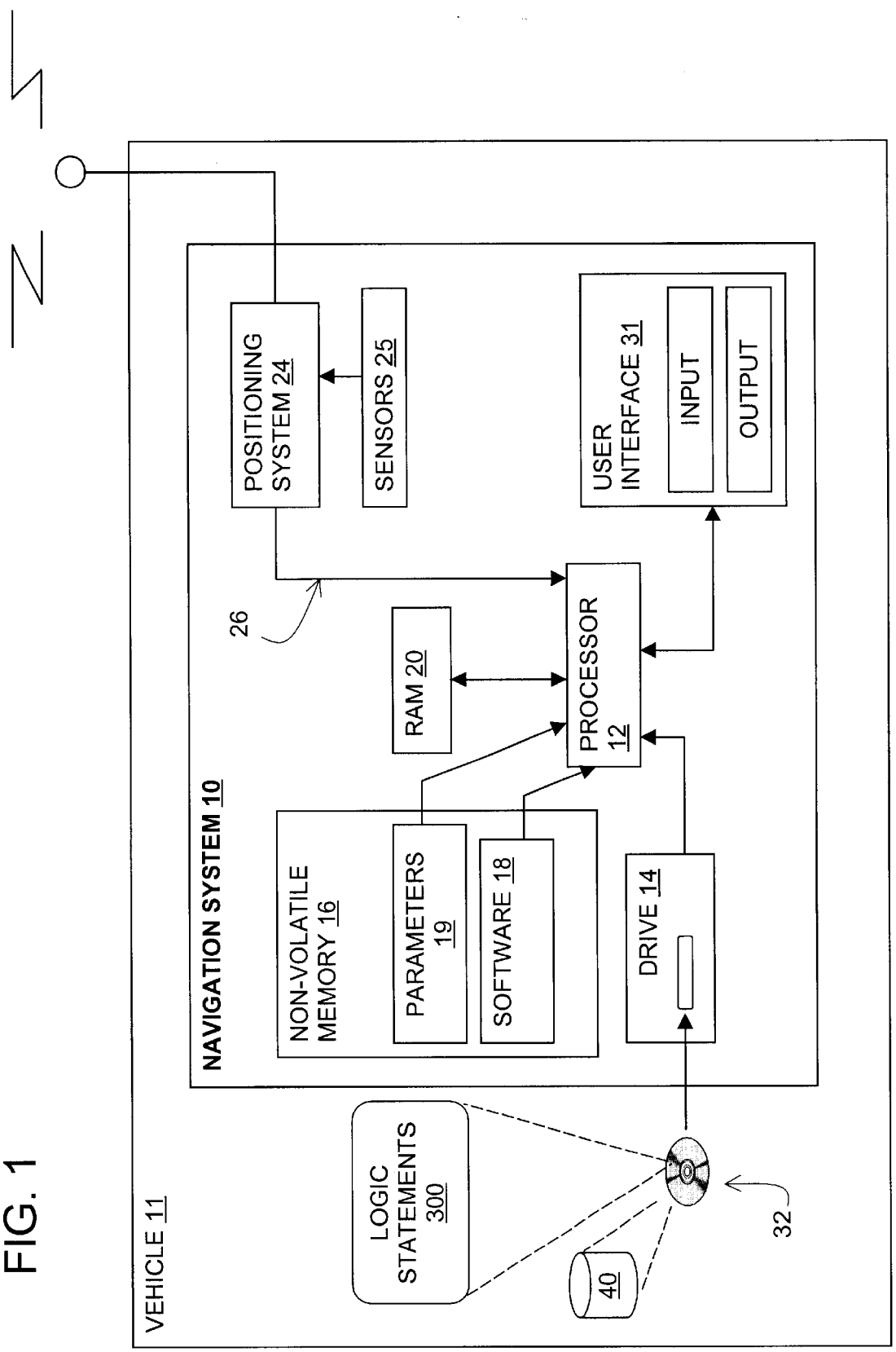
FIG. 1 is a block diagram illustrating a navigation system.

Referring to FIG. 1, there is a block diagram of a navigation system 10. The navigation system is comprised of hardware and software components. The hardware and software components operate together to provide navigation-related features to end users (e.g., drivers and/or passengers). In FIG. 1, the navigation system 10 is installed in a vehicle 11, such as a car or truck, although in alternative embodiments, the navigation system 10 may be located outside of a vehicle or may be implemented on various other platforms or environments, as described below. The embodiments disclosed herein are not limited to in-vehicle systems.

Referring to the embodiment illustrated in FIG. 1, the navigation system 10 includes a processor 12, a drive 14 connected to the processor 12, memory 20 and a non-volatile memory storage device 16 for storing navigation system programming (software, firmware, data, etc.) 18 for operating the navigation system, as well as data, such as configuration parameters 19. The navigation system 10 may also include a positioning system component 24. The positioning system component 24 may use GPS-type technology, a dead reckoning-type system, or combinations of these, or other systems, all of which are known in the art. The positioning system component 24 may include suitable sensing devices 25 that measure the speed, direction, angular acceleration, and so on, of the vehicle. The positioning system component 24 may also include appropriate technology to obtain a GPS signal, in a known manner. The positioning system component 24 outputs signals 26 to the processor 12. The signals 26 are used by programming 18 that is run on the processor 12 to determine the location, direction, travel distance, speed, etc., of the navigation system 10.

The navigation system 10 also includes a user interface 31. The user interface 31 includes appropriate equipment that allows the end user to input information into the navigation system. This input information may include a request to use the navigation features of the navigation system. For example, the input information may include a request for a route to a desired destination. The input information may also include other kinds of information, such as configuration information. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display, speakers, or other means.

The components of the navigation system described thus far, including the processor, drive, memory, positioning system component, user interface, and so on, may be of any type used in navigation systems.

The navigation system 10 uses geographic data 40. The geographic data 40 are stored on a storage medium 32. The storage medium 32 is installed in the drive 14 so that the geographic database 40 can be read and used by the navigation system. The storage medium 32 may be removable and replaceable so that a storage medium with appropriate geographic data for the geographic region in which the vehicle is traveling can be used. In addition, the storage medium 32 may be replaceable so that the geographic data 40 on it can be updated easily. In one embodiment, the geographic data 40 are provided by Navigation Technologies Corporation of Rosemont, Illinois.

In one embodiment, the storage medium 32 is a CD-ROM disk. In an alternative embodiment, the storage medium 32 may be a PCMCIA card in which case the drive 14 would be substituted with a PCMCIA slot. Various other storage media may be used, including fixed or hard disks, DVD disks or other currently available storage media, as well as storage media that may be developed in the future. The storage medium 32 and the geographic data 40 do not have to be physically provided at the location of the navigation system, as explained in more detail below in connection with alternative embodiments. In alternative embodiments, the storage medium 32, upon which some or all of the geographic data 40 are stored, may be located remotely from the rest of the navigation system and portions of the geographic data provided via a communications link, as needed.

Figure 2:
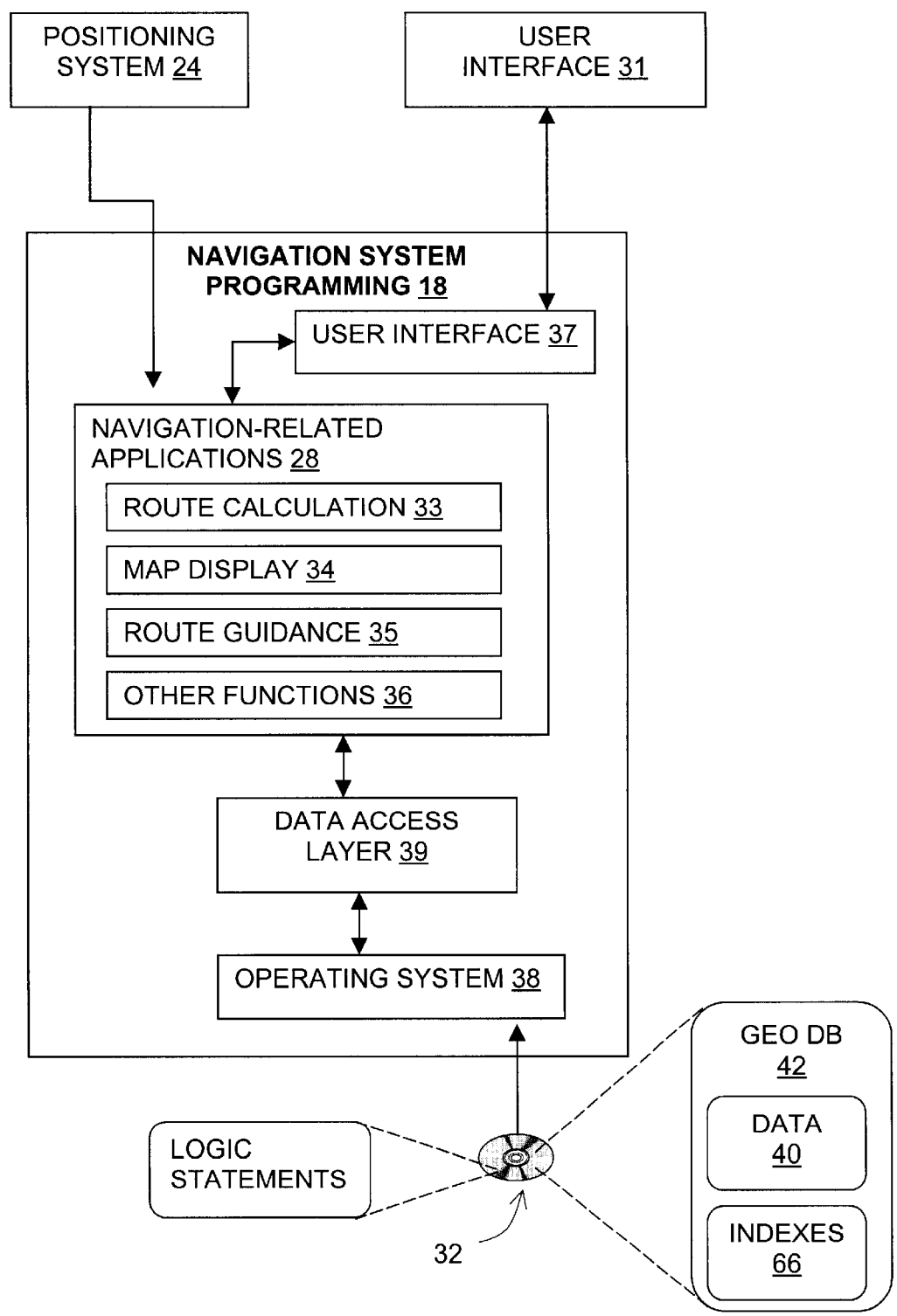
FIG. 2 is a block diagram illustrating parts of the navigation application software of FIG. 1.

Referring to FIG. 2, included in the navigation system programming 18 in the navigation system 10 are navigation-related applications 28. These navigation-related applications 28 use the geographic data 40 and the output from the positioning system component 24 (if available) to provide various navigation-related features and functions. These navigation-related applications 28 include a route calculation application 33, a map display application 34, a route guidance application 35 (wherein detailed directions are provided for reaching a desired destination), and geo-coding (used for the selection of destinations). The navigation applications 28 may include other functions or subprograms 36 in addition or alternatively to these. For example, the navigation applications 28 may include a vehicle positioning application that provides a map matching function. Although these navigation-related applications 28 are represented as separate programs, they may combined together in one application.

The navigation system programming 18 also includes user interface programming 37. The user interface programming 37 supports the user interface equipment 31 (in FIG. 1). For example, this user interface programming 37 provides for the graphical display of information to the end user via the user interface 31, the display of menus, prompts, and so on. The user interface programming may also provide for voice or speech recognition and/or recorded speech segments or speech synthesis.

The navigation system programming 18 may also include an operating system program 38. The operating system program 38 is appropriate for the hardware platform of the navigation system 10.

The navigation system programming 18 also includes a data access layer 39. The data access layer 39 includes programming for accessing the geographic data 40 on the media 32. In a preferred embodiment, the data access layer 39 is located between the navigation applications 28 and the geographic data 40, or more particularly between the navigation functions 28 and the operating system 38. The data access layer 39 is described in more detail below.

II. The Geographic Database

A. Overview.

Referring to FIG. 2, the geographic data 40 are stored on the medium 32 in the form of one or more computer-readable data files or databases 42. The geographic data 40 may include information about the positions of roads and intersections in or related to a specific geographical region, and may also include information about the attributes of the roads and intersections, such as one-way streets and turn restrictions, street addresses, alternative routes, as well as information about hotels, restaurants, museums, stadiums, offices, automobile dealerships, auto repair shops, etc. The coverage region of the geographic database 42 may include a metropolitan area, such as Chicago and its suburbs, New York and its suburbs, Los Angeles and its suburbs, or alternatively, the regional area may include an entire state, such as California, an entire country, such as the United States, or more than one country, such as Germany, France, and Italy, or combinations of these. Data about more than one region may be stored on the storage medium 32.

In order to provide a reasonable level of functionality for a coverage area, a relatively large database is provided. Storage media, such as CD-ROM disks, DVD disks, hard drives, or PCMCIA cards, are capable of handling databases of the size and complexity sufficient to provide suitable functionality. Because a navigation system uses geographic data in certain known and expected ways to perform known functions, the geographic data can be organized, structured, and/or arranged in a manner that facilitates their use in these known ways by the navigation system. Some of the ways that the geographic data 40 can be can be organized, structured, or arranged in a geographic database are described in U.S. Pat. Nos. 5,968,109, 5,974,419, and 5,953,722, the entire disclosures of which are incorporated by reference herein.

Figure 3:
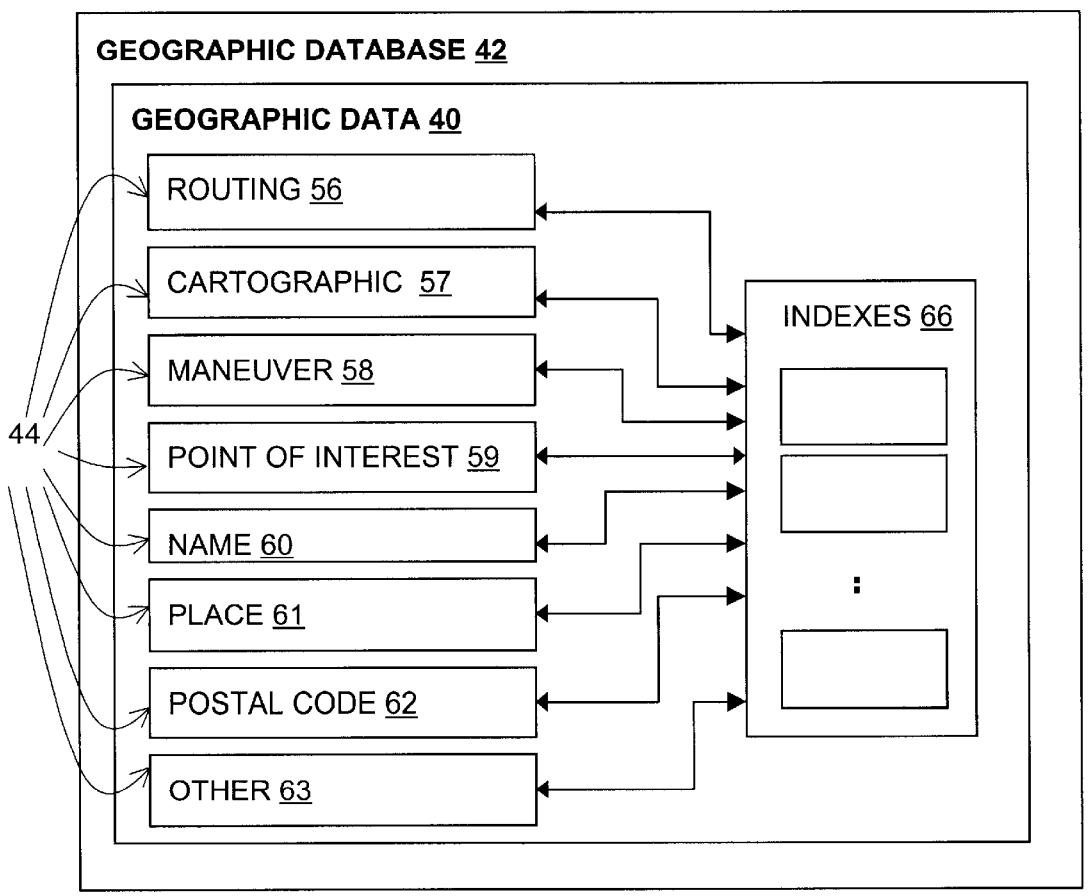
FIG. 3 is a diagram illustrating the different types of data included in the geographic database of FIGS. 1 and 2.

FIG. 3 illustrates an organization of the geographic database 42. The organization shown in FIG. 3 represents one way that geographic data 40 can be organized in a database. Various other arrangements are possible and can be used. In FIG. 3, the geographic database 42 is shown to be comprised of separate subsets 44 of data. These subsets 44 include routing data 56, cartographic data 57 (for map display), maneuver data 58 (for route guidance), point-of-interest data 59 (for identifying specific points of interest, such as hotels, restaurants, museums, stadiums, airports, etc.), name data 60 (identifying the names of roads, places and other features), places 61 (e.g., cities, states, counties), postal codes 62 and other kinds of data 63. The geographic database 42 may be defined with different data types or with fewer or more data types.

Each subset 44 of geographic data 40 includes the data and associated attributes required to perform a particular navigation function but excludes data and attributes which are not needed to perform the function. There is some overlap of data between each of these subsets, with the result that some information may be included in more than one subset. For example, a data entity representing a road segment in the routing data 56 and a data entity representing the same road segment in the cartographic data 57 may include attributes identifying the nodes located at the ends of the road segment. Although this duplication may result in a larger overall data storage requirement, each of the navigation functions (i.e., the applications 28 in FIG. 2) benefits from the resultant efficiency of handling smaller amounts of data.

Although the organization of the geographic data 40 into different types provides for efficient use of the data by the different navigation functions, it is necessary to provide that the different functions that use these different types work together. To permit these types 44 of data to work together, indexes 66 are included as part of the geographic database 42. The indexes 66 provide cross references, search trees, and/or other data finding techniques. The indexes 66 can be located external of any of the data types 44 or the indexes 66 may be located within any of the types 44 of data. In this embodiment of the geographic database 44, both internal and external indexes are used.

B. Layering of Geographic Data

Another way that the geographic data 40 can be organized to enhance their use is to provide the data in layers. Some of the navigation applications, such as the map display application and the route calculation application, may use data at different levels of detail. Therefore, within some of the subsets of data types, the geographic data 40 are provided in separate layers.

One way to implement layering is to associated each road with a rank. A rank of a road may correspond to its functional class. Roads having a rank of "4" may include high volume, controlled access roads, such as expressways and freeways. Roads having a rank of "3" may be high volume roads with few speed changes, but are not necessarily controlled access roads. The lower ranked roads handle corresponding lower volumes and generally have more speed changes or slower speeds. Roads having a rank of "0" can handle the lowest volumes. For example, these lowest ranked roads may include side streets, alleyways, etc. In the geographic database 42, each portion of a road is represented by a separate road segment data entity. The road segment data entity identifies the rank of the road segment that it represents.

Figure 4:
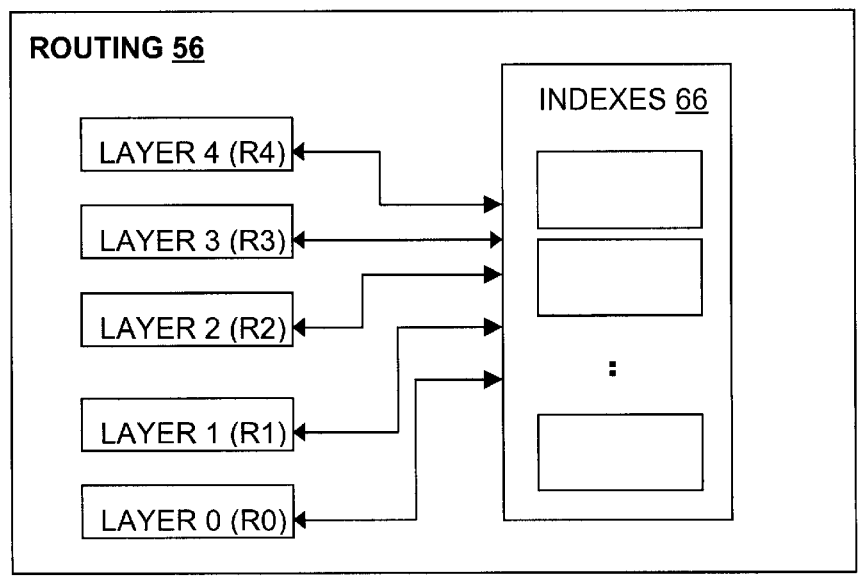
FIG. 4 is a diagram illustrating separate layers of the routing data shown in FIG. 3.

In the geographic database, layers may be implemented physically or logically. To provide physical layers, separate collections or groups of data corresponding to one or more layers are provided. The rank of a road segment data entity is used to determine the highest data layer in which a road segment entity is included. For example, referring to FIG. 4, the routing type data 56 may include five separate layers of the data, R0, R1, R2, R3, and R4. Each of these layers comprises a separate collection of the routing data, with a different level of detail, which can be used by the route calculation application 33. In the routing data 56 of the geographic database, layer 0 ("R0") includes the road segment data entities (and some or all of their corresponding routing data attributes) having a rank of "0" or higher. Thus, layer 0 includes road segment data entities corresponding to all the portions of all the roads in the geographic region. Layer 1 of the routing data 56 comprises a separate subset (or collection) of the routing data and includes only the routing segment data entities (and some or all of their corresponding routing data attributes) having a rank of "1" or higher. Layer 2 of the routing data 56 comprises a separate subset of the routing data and includes only the routing segment data entities (and some or all of their corresponding navigation data attributes) having a rank of level 2 or higher, and so on. A highest layer (layer n) includes only records representing roads having a rank of n. In a present embodiment, n is equal to 4, although in other embodiments, n may be any number greater than 0. Each higher layer includes fewer records, however these records represent roads upon which travel is generally faster.

The other types of data may include separate collections of the data, each with a different level of detail. For example, the cartographic data 57 includes layers similar to the routing data 56. The different layers of the cartographic data 57 can be used by the map display application 34 to provide rapid panning and zooming.

Although the organization of some of the data into layers results in some duplication of the data, the increased efficiency provided by layering generally offsets any disadvantages. As with the use of separate types of data mentioned above, the need arises to allow these layers to work together. Indexes 66 may be provided for this purpose.

As mentioned above, layering can also be implemented logically. When layering is implemented logically, a single collection of data (of a type) is provided that includes data entities of all ranks. However, a filtering routine (in the data access layer 39) suppresses data entities representing roads of lower ranks when only higher ranked roads are desired.

C. Parcelization of Geographic Data

Figure 6:
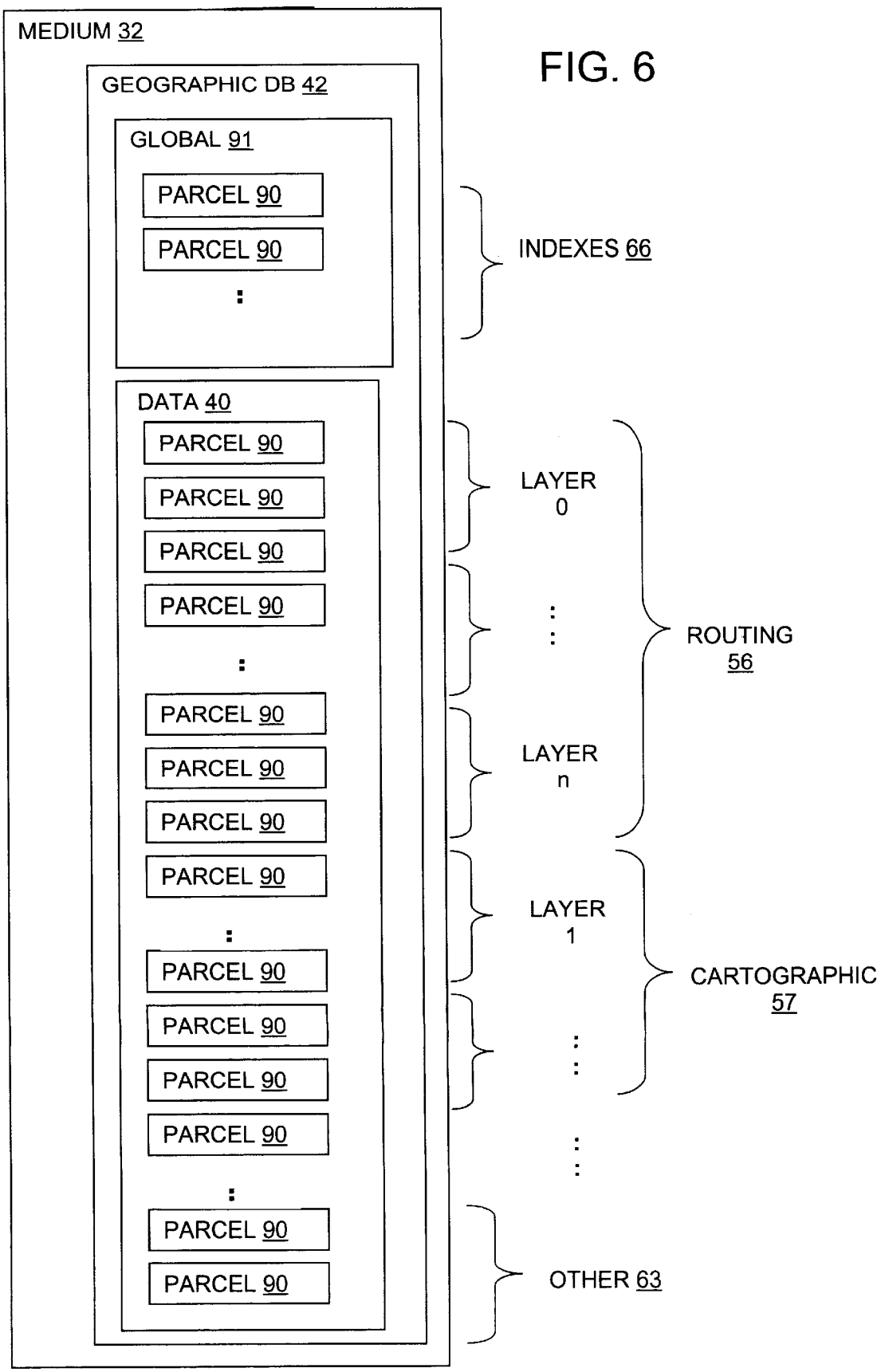
FIG. 6 is a diagram showing the arrangement of parcels of data in the geographic database of FIGS. 1 and 2 according to the parcelization method illustrated in FIG. 5.

Another way that can be used to facilitate the use of geographic data 40 by navigation systems is to parcelize the data. Assuming that all the data records for a given entire geographic region are not loaded into the memory of the navigation system at the same time, it would be desirable to load into memory only those data that are needed to perform a desired function. In order to accomplish this, the geographic data 40 are organized in a manner that minimizes the amount of time required to access and read data from the medium in order to perform a navigation function. To provide for this, the data 40 are organized into parcels. When data are parcelized, the plurality of data records that together comprise the geographic database 42 are grouped together into separate groupings or parcels. FIG. 6 shows the geographic data 40 organized into parcels 90. A parcel 90 of data is established so that all the data in the parcel are accessed together at the same time from the medium 32. This may relate to the quantity of data that can be accessed in a single disk access, although it may be related to some other factor. For some types of media such as CD-ROM disks, a parcel may be established to be a 16 Kilobyte quantity of data. As shown in FIG. 6, the geographic data 40 and the indexes 66 to the geographic data 40 may be formed into separate parcels 90. The parcels of indexes 66 may be located in a separate portion of the database 42, such as a global portion 91. Indexes may also be included within each of the data types 44. For example, there may be one or more indexes within each parcel 90 of geographic data 40.

In conjunction with parcelization, another way that some of the geographic data can be organized to facilitate their use is to organize the data spatially. When geographic data are organized spatially, features that are close together physically in the geographic region are represented by data records that are physically (or logically) close together in the database. Geographic data can be both parcelized and spatially organized to take advantage of both these techniques.

For purposes of forming the data into parcels, the data may be first separately organized into the different types 44, as described above. Some of these types of data may be parcelized spatially in order to facilitate use of the data by the navigation applications 28. Spatially-parcelized data are arranged so that the data that represent geographically proximate features are located logically and/or physically proximate in the database 42 and/or on the medium 32. For some of the navigation applications, spatial parcelization of the data provides for reading needed geographic data from the medium more quickly and loading related data into memory where they can be used. This kind of organization minimizes seeking on the storage medium 32 and may speed up operation of these navigation functions. The routing, cartographic, and point of interest data are included among the kinds of data that may be spatially organized.

There are a number of different procedures that can be used for parcelizing spatially organized geographic data. For example, a simple parcelization method may provide for separating the geographic data into a plurality of parcels or groupings wherein the data in each parcel represent features encompassed within a separate one of a plurality of regular sized rectangles which together form a regular, rectangular grid over the geographic region. Another method for parcelization is to separate the data into parcels encompassed within rectangular areas where each of the rectangles is formed by a bisection of rectangles encompassing parts of the region until a parcel size below a maximum threshold is obtained. In addition, parcelization procedures are disclosed in the copending application Ser. No. 08/740,295, filed Oct. 25, 1996, the entire disclosure of which is incorporated by reference herein, and parcelization procedures are also described in U.S. Pat. No. 5,953,722, the entire disclosure of which is incorporated by reference herein. Still another method of parcelization to which the disclosed subject matter can be applied is described in U.S. Pat. No. 4,888,698.

Figure 5:
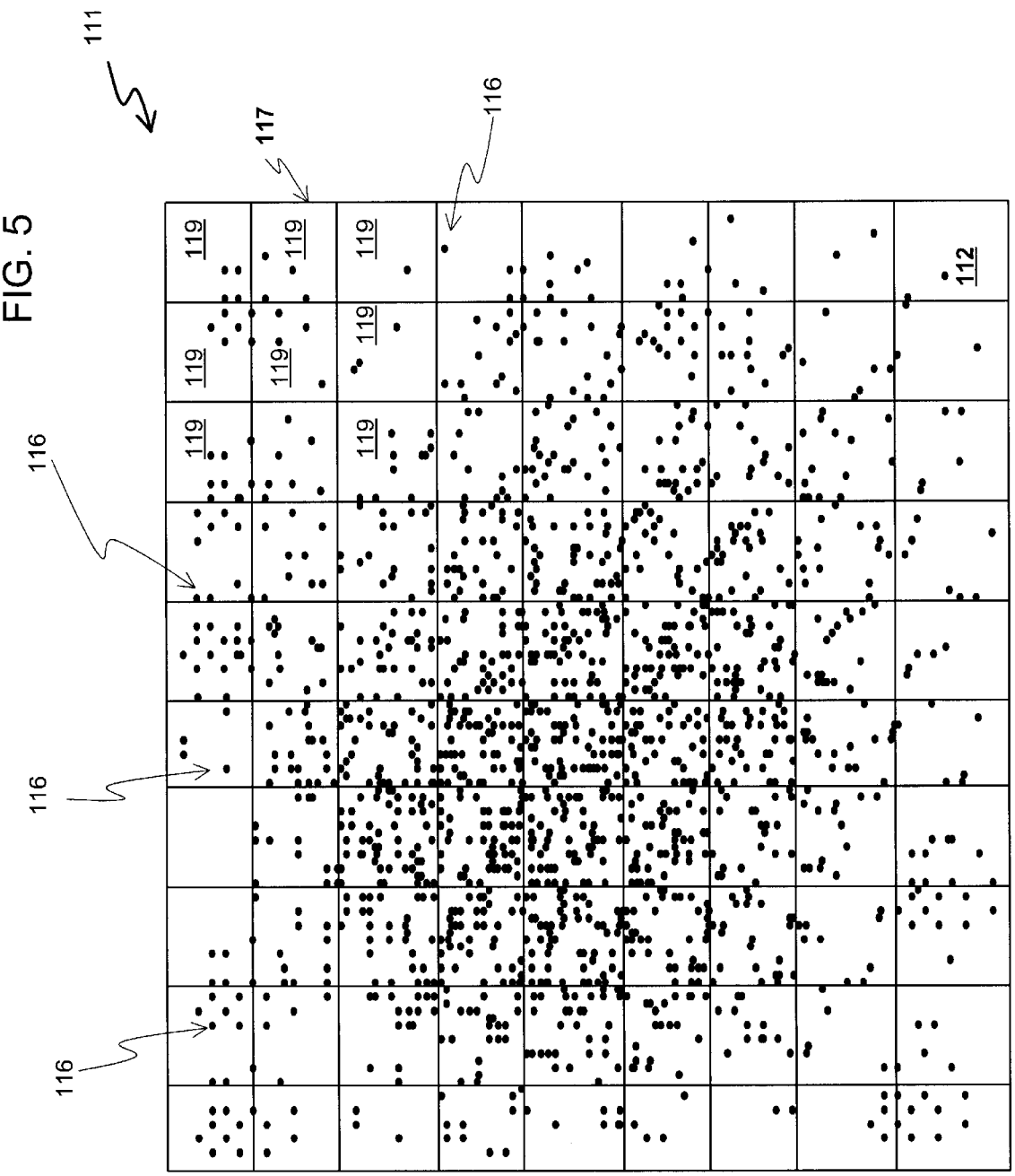
FIG. 5 shows a map of a geographic region used to illustrate application of a parcelization method to spatially organized geographic data.

Parcelization of spatially organized data is illustrated with reference to FIGS. 5 and 6. FIG. 5 shows a map 111 of a geographic region 112. A plurality of positions 116 (represented by the dots or points) are shown to be located on the map 111. Each of the positions 116 represents a place or point in the geographic area 112 at which there is located a feature about which information is included in the geographic database 42 of FIG. 6. For example, the positions 114 may correspond to the physical locations of end points of road segments, points along road segments, points-of-interest (such as hotels, civic centers, etc.), and so on, which are represented by the data in the geographic database 42. Each of these locations 116 has a unique physical location (latitude, longitude, and optionally absolute or relative altitude) and each of the locations 116 can be uniquely identified by its two dimensional (or three dimensional) geographic coordinates (i.e., latitude, longitude, and optionally altitude).

In FIG. 5, a grid 117 overlays the geographic region 112 represented by the map 111. The grid 117 divides the geographic region 112 into a plurality of rectangular areas 119. These rectangular areas 119 may be all the same size or may have different sizes depending upon the procedure used for parcelization. The grid lines of the grid 117 represent the boundaries of the rectangular areas 119. The locations of the boundaries may depend on the parcelization procedure used. In general, when using any of the procedures for spatial parcelization, the data records of a particular type of data which represent features that are encompassed within each rectangular area 119 are grouped together in a separate parcel of data. Therefore, each parcel 90 of spatially organized data (in FIG. 6) includes one or more data records which represent the geographic features encompassed within a separate one of the plurality of rectangles 119 (as shown in FIG. 5).

As shown in FIG. 6, the parcel 90 is then stored to form the database 42 so that the data in each parcel 90 are logically and/or physically grouped together. Since the parcel represents the quantity of data that is accessed at the same time from the medium by the navigation system, when a parcel of data is accessed, all of its data records are read into the memory of the navigation system at the same time. With reference to the map 111 of FIG. 5, this means that all the data records of a spatially organized type of data encompassed within each rectangle 119 are accessed together as a group. It can be appreciated that for certain kinds of navigation functions, it is desirable to have in memory at the same time all the data records that represent features that are physically close together in the geographic region.

As the parcels 90 are formed for these types of data, the parcels are ordered. Various types of ordering may be used. In general, it is preferred that the parcels be ordered in a manner that minimizes searches for data. One way to order spatially organized parcels is to use a depth-first ordering from a kD-tree index within each type of data. This provides an ordering similar to Peano-key ordering. Parcels may be stored on disk (i.e., medium 32 in FIGS. 1 and 2) in this approximate Peano key order. One or more indexes, such as a kD-tree, can be used to access parcels spatially. This index is useful for initial location of an arbitrary position, such as when a program in a navigation system initially locates the data corresponding to a current vehicle position. As the parcels 90 are ordered, each may also be assigned a unique parcel identifier (e.g., a "parcel ID"). The parcel ID may be used to identify the parcel and/or its location on the medium.

As mentioned above, some kinds of data are not spatially organized (i.e., each parcel of non-spatially organized data does not necessarily correspond to any of the rectangular areas 119 in FIG. 5.) For example, data that represent the names of streets (i.e., the name data 60 in FIG. 3) may be organized alphabetically instead of spatially. Data that represent administrative or political entities, such as countries, states, cities, and so on, are other kinds of data that are not spatially organized. For example, data that represent administrative or political entities may be organized by administrative hierarchy. In a present embodiment, these non-spatially organized types of data are parcelized as well.

III. The Data Access Layer
A. Overview

As stated above in connection with FIG. 2, the navigation system programming 18 includes the data access layer 39 that provides for accessing the geographic data 40 for the navigation applications 28. As described above, the data 40 in the geographic database 42 may be compressed, arranged, organized, parcelized, and indexed on the medium 32 to facilitate their use by the various navigation applications 28. The data access layer 39 deals with the organization and arrangement of the geographic database 42 on the storage medium 32 in order to return data for use by the navigation applications 28.

The data access layer 39 is located logically between the navigation applications 28 and the geographic database 42. In one embodiment, the data access layer 39 and the navigation application programs 28 are compiled together to form a single executable module although other types of compilations and/or arrangements may be used.

Figure 7:
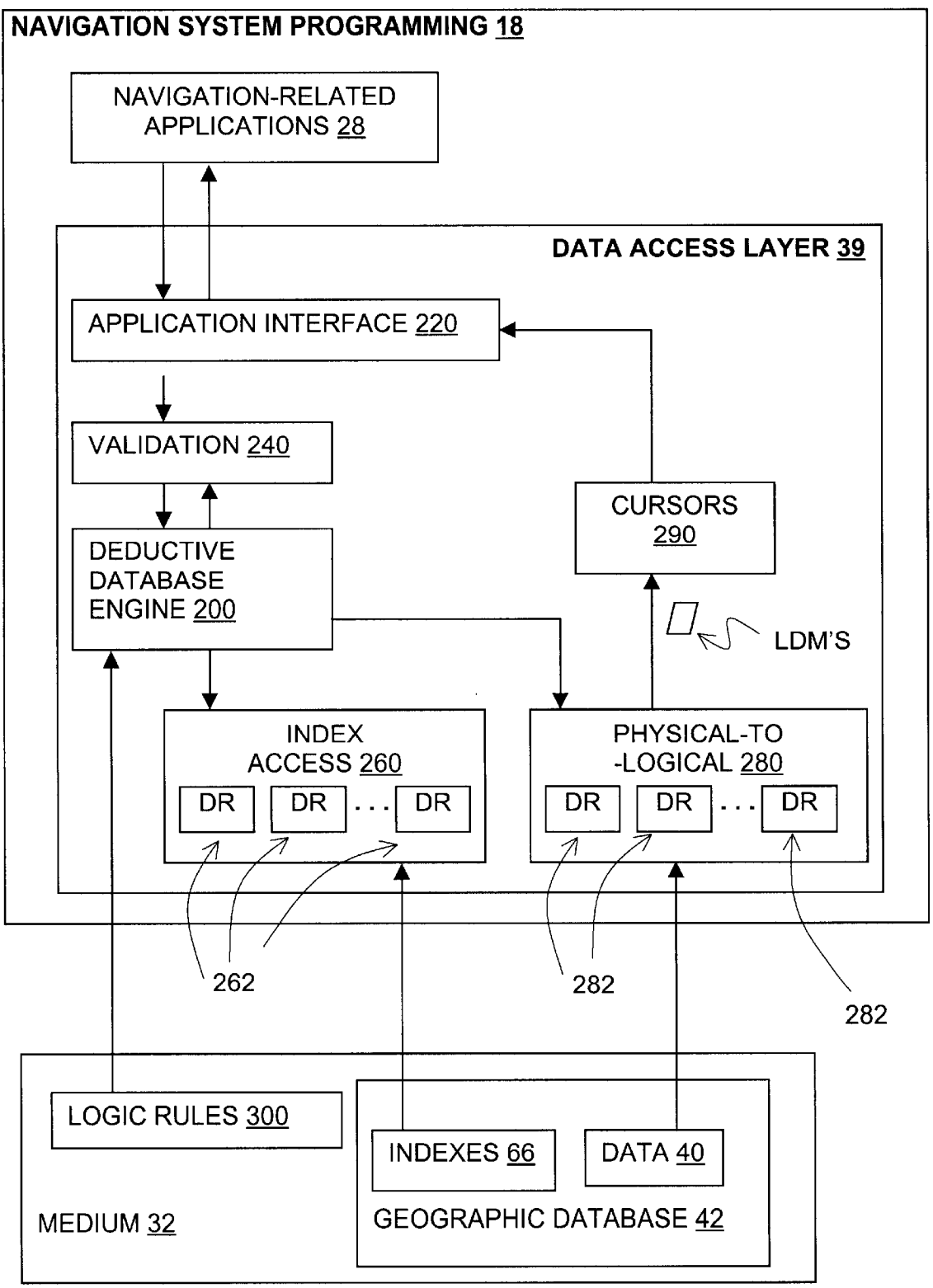
FIG. 7 is a block diagram of the data access layer of FIG. 2.

Referring to FIG. 7, the data access layer 39 is comprised of several subsystem components. In FIG. 7, the data access layer 39 includes a deductive database engine 200, an application interface 220, a query validation system 240, an index access system 260, a physical-to-logical conversion system 280, and a cursor management system 290. Each of these subsystem components is comprised of programming that implements certain functions. There are internal interfaces between these subsystem components. Each of these components is described in more detail below.

(Portions of the data access layer 39 of the present embodiment are similar to the data access layer disclosed in U.S. patent application Ser. No. 08/740,298, filed Oct. 25, 1886, the entire disclosure of which is incorporated by reference herein. The ways in which the data access layer 39 of the present embodiments differs from the subject matter disclosed in Ser. No. 08/740,298 are described herein. Except for these differences, the data access layer 39 of the present embodiments may be similar to the data access layer disclosed in Ser. No. 08/740,298.)

B. Logic Rules Stored With Database

FIG. 7 shows logic rules 300. The logic rules 300 are associated with the geographic database 42. The logic rules 300 are not part of the data access layer 39. As shown in FIG. 7, the logic rules 300 are stored with the geographic database 42 on the medium 32. In alternative embodiments, the logic rules 300 may be stored elsewhere, as described below.

Figure 8:
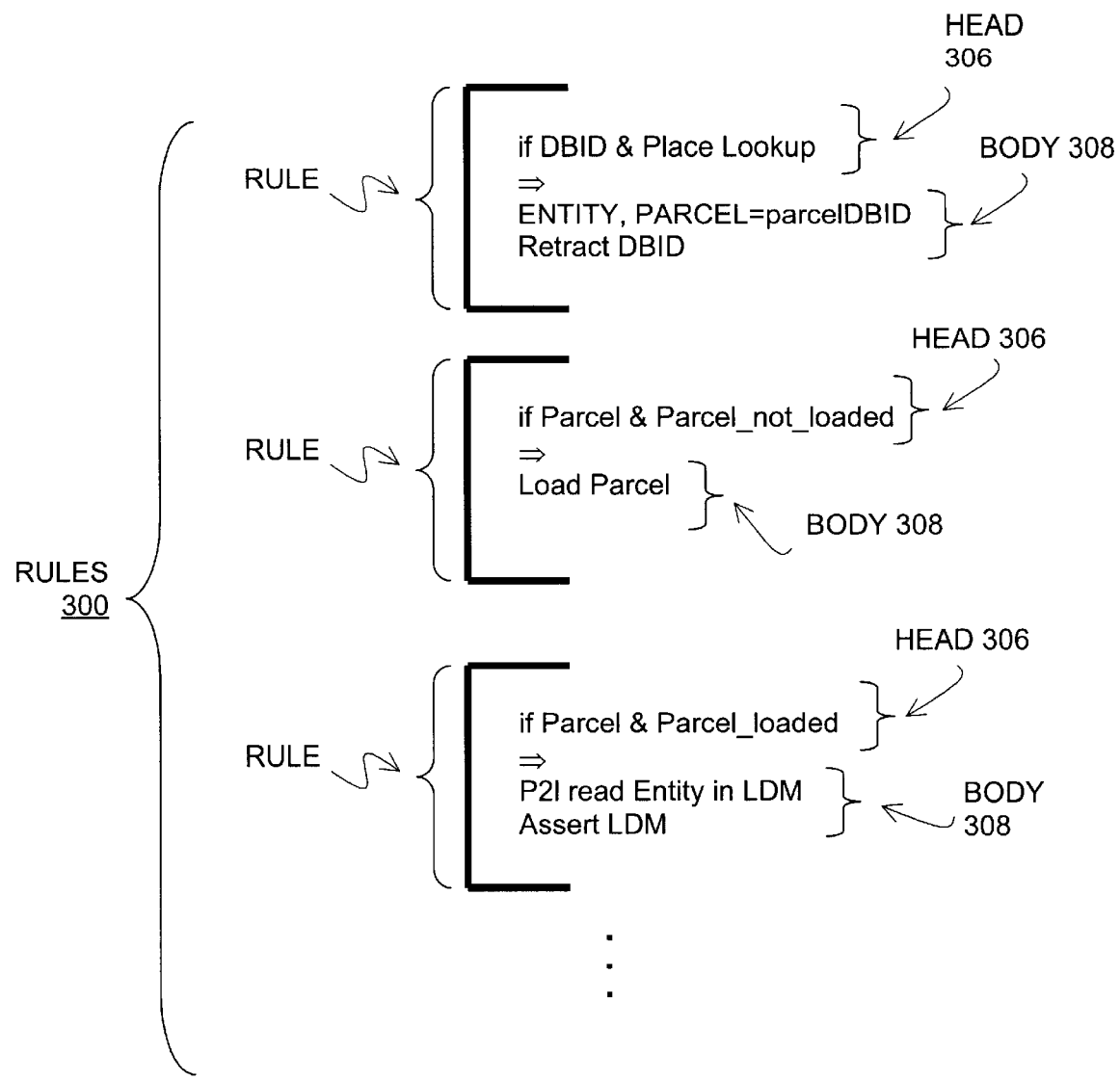
FIG. 8 is a diagram illustrating the components of the rules shown in FIG. 7.

FIG. 8 shows the components of several logic rules 300. Each logic rule 300 is comprised of a head 306 and a body 308. The head 306 of a logic rule 300 contains one or more statements. Each statement may include one or more variables. A constant can substitute for a variable. A variable can be a "free variable" meaning that the variable can take on any value.

Each statement can be evaluated to be either true or not true. Statements within the head 306 of a rule are combined with logical relation operations, (e.g., "and", "or", "not", and so on).

Each statement relates to either data in the geographic database or the state of the navigation system. A statement that relates to data 40 from the database 42 is intrinsic and a statement that relates to the state of the navigation system is extrinsic. The "state" of the navigation system refers to the current but changeable state of the navigation system as determined by the previous execution of other logic rules and the data in the database.

The body 308 of each logic rule 300 specifies one or more actions to be taken. The action can be a call to a function (such as a function in the physical-to-logical system 280, the index access system 260, or the validation system 240). The action specified in the body of a logic rule can also set or change the state of the navigation system.

The logic rules 300 may be compressed on the medium 32. The logic rules 300 may be organized in a manner that facilitates use and access of the rules by the deductive database engine 200.

C. Deductive Database Engine

Referring again to FIG. 7, the deductive database engine 200 uses the logic rules 300 associated with the geographic database 42 to determine how to access and/or use the data 40 contained in the geographic database 42.

Figure 9:
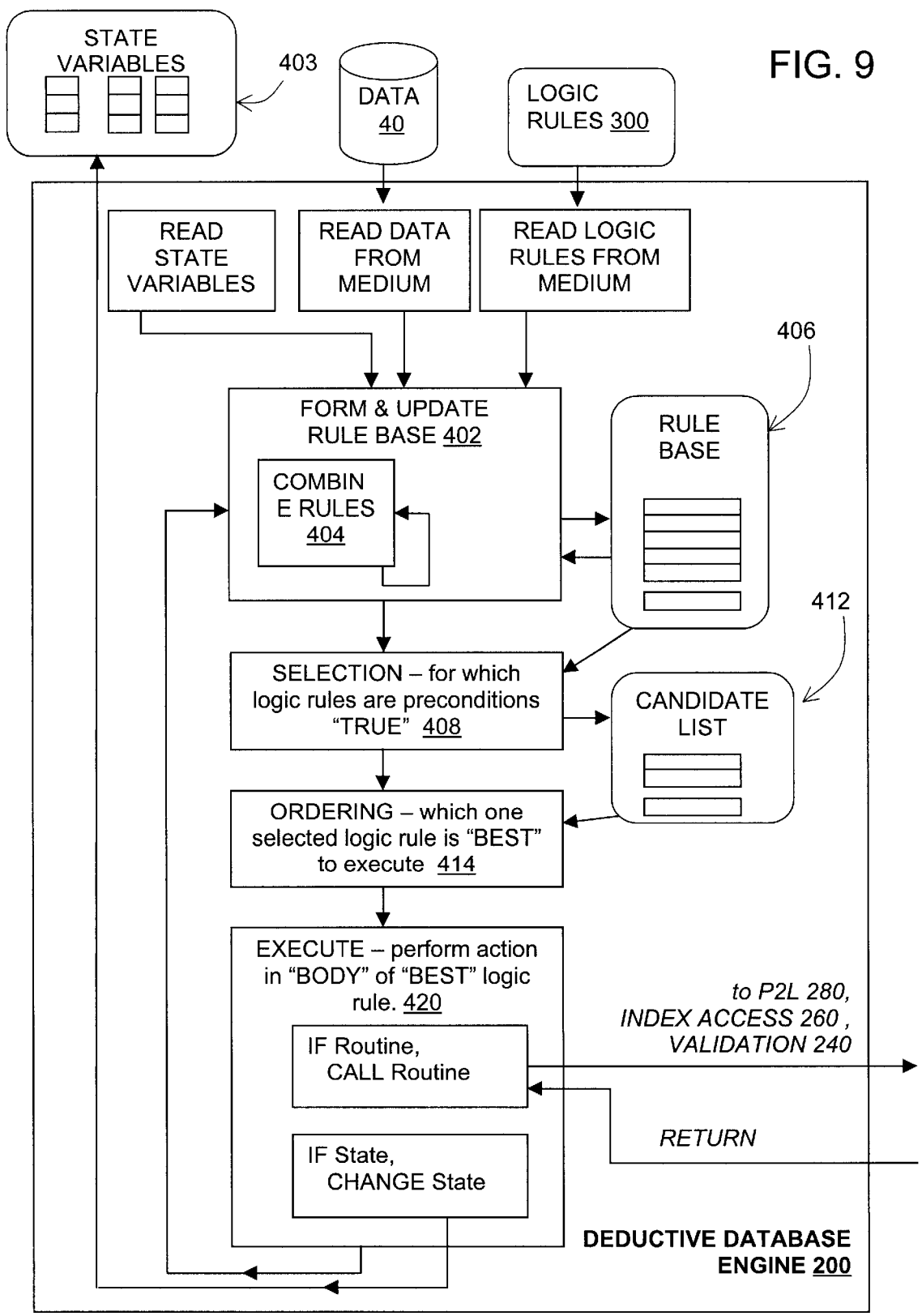
FIG. 9 is a flow chart of the operation of the deductive database engine shown in FIG. 7.

FIG. 9 shows the steps performed in an execution cycle 400 of the deductive database engine 200. The execution cycle 400 of the deductive database engine 200 loops continuously during operation of the navigation system.

Within the deductive database engine 200, a process 402 forms (and updates) a rule base 406. When all the rules governing the system's behavior are grouped together with a mechanism to quickly find the rules appropriate to a certain state of the navigation system, the group of rules is referred to as a "rule base." The rule base is a dynamic temporary structure. In forming the rule base 406, the process 402 includes, to the extent necessary, the steps of reading the logic rules 300 from the medium 32, obtaining data 40 from the geographic database 42, and obtaining other data 403 concerning the state of the navigation system. Using these rules and data, the process 402 forms the rules that comprise the rule base 406. All the logic rules 300 stored on the medium 32 are available to the deductive database engine 200. However, the process 402 determines which of the logic rules 300 from the medium 32 to include in the rule base 406. Not all the logic rules 300 from the medium 32 are necessarily included in the rule base 406.

Some of the rules included in the rule base 406 may be formed by combining statements from separate logic rules. The process of combining statements replaces statements in rules with simpler statements until all the predicates refer to elements in the database. The statement combining process may be performed by an internal part of the rule base formation process (e.g., as shown at 402 in FIG. 9). Alternatively, the statement combining process may be performed by an execution cycle of the deductive database engine (e.g., steps 402–420).

New rules can be added to the rule base during an execution cycle of the deductive database engine. Rules can also be deleted from the rule base during an execution cycle of the deductive database engine.

Once all the rules that form the rule base 406 are determined, a process 408 in the deductive database engine 300 determines which rules from the rule base 406 are satisfied, i.e., the precondition specified in the head 306 of the logic rule is "true." There may be several rules capable of execution at a single cycle. When the head of a rule (from the rule base 406) is a logically true statement, then the rule is added to a list of rules that may be executed. This set of rules (from the rule base 406) that are satisfied forms a candidate list 412. (This set of rules in the candidate list is formed (or updated) for each execution cycle of the deductive database engine.)

Of the logic rules in the candidate list 412, another process 414 in the deductive database engine 300 determines which single logic rule from the candidate list 412 to execute. A selection of which rule to "fire" (i.e., execute) is made by considering information about the candidate rules, such as how specifically the rule applies to the current state, how important the rule was declared to be, how recently the rule was fired previously, and so on. This can be determined by an ordering of the rules or by configuration of the deductive database engine (i.e., more rules) that prioritizes some types of rules over others.

After determining which rule from within the candidate list 412 to fire, the deductive database engine 200 includes a process 420 that executes the action specified in the body 308 of the rule. The action specified in the body 308 can refer to a routine in the physical-to-logical conversion system 280, the index access system 260, or the validation system 240. The action 308 can also specify a change of state. If the action specified in the body 308 refers to a routine in the physical-to-logical conversion system 280, the index access system 260, or the validation system 240, the routine is called and executed. After the routine is executed, the routine returns to the deductive database engine 200 and the operation of the deductive database engine 200 continues by looping back to the Step 402. If the action specified in the body 308 is for a change of state, the state is changed and saved (in the state variables 406) and the operation of the deductive database engine 200 continues by looping back to the Step 402.

Operation of the deductive database engine 200 continues in this manner.

D. Processing of Data as Rules

In the deductive data model, each row of data (i.e., each "record") in the database 42 is considered as a part of the state of the navigation system. Thus, each row is considered to be a logic statement that contains as many parts as there are columns in the data table. For example, a table of Restaurants and their locations might have columns (i.e., "fields") of "Name", "Cuisine", "Latitude", "Longitude", "AddressNumber", and "Block". In this example "Block" is a row number into a table of records that contains the street name and city. A row of the Restaurant table, treated as a rule, would look like "Name" equals "New China Restaurant" and "Cuisine" equals "Chinese" and "Latitude" equals "nnn'mmm''" and "Longitude" equals "qqq'rrr''" and "AddressNumber" equals "1185" and "Block" equals "2345". A deductive query of a database is treated as a search for data that allows a rule's head to be considered "true" so that the body of the rule can change the system's state. When a row is retrieved as making the head of a rule 'true', then all the column values of the row are available to the body of the rule for changing the system state.

Once the row is retrieved, it is not eligible to fire the rule that retrieved it until another row has fired. Thus, a query that retrieves all Chinese restaurants would look like "Restaurant.Cuisine='Chinese' and Block.BlockID= Restaurant.Block=> print(Restaurant.Name, Restaurant.AddressNumber, Block.StreetName, Block.City)". Since the row of the database that contains the data selected is not allowed to fire again, this rule will be fired once for every Chinese restaurant in the restaurant table.

Indexes in the database (e.g., indexes 66 in FIG. 3) are treated exactly like data and are queried with the same rules and query engine.

An advantage of a deductive database over a relational database is that the columns are defined as elements of sets rather than as simple types. The Restaurant table's Block column could have contained the entire set of Block data rather than having been an ID in another table.

E. Application Interface

Referring again to FIG. 7, the application interface 220 interfaces with the navigation applications 28. The application interface 220 accepts requests for geographically-referenced data from the navigation applications 28 and provides replies to the requests. The application interface 220 provides a function call interface to the navigation applications 28. The function call interface defines a data structure view (referred to as the "Logical Data Model" or "LDM") of the geographic data 40 on the storage medium 32 to the navigation application programs 28. The logical data model represents the data in fully decompressed form without cross-referencing or other types of information that require processing before the data can be used. In one embodiment, the data structure view defined by the application interface 220 is in the C language.

F. Query Validation System

As stated above, the data access layer component 39 includes the data validation system 240. The data validation system 240 checks the requests received by the application interface 220 from the navigation applications 28. The query validation system 240 checks to determine whether the geographically-referenced data request from the navigation application 28 is valid. The function 240 receives data by which valid requests for data can be determined. The function receives these data from the deductive database engine 200. When the deductive database engine begins operation, it is initialized using a set of logic rules designed for that purpose. These initialization logic rules identify the types of data and indexes that are present on the medium and as a consequence what types of queries are supported. Using these initialization logic rules, a table of supported queries and data types can be prepared. This table is used by the query validation system when requests for geographically-referenced data are requested by the navigation applications 28.

G. Index Access System

The index access system 260 is part of the data access layer 39. The index access system 260 includes data retrieval routines 262 for accessing and using the indexes 66 in the geographic database 42 on the medium 32. The indexes 66 are used to locate data stored on the medium in order to satisfy a request for geographically-referenced data received by the application interface 220. The indexes 66 may be used to identify which one or more parcels on the medium contain data needed to reply to the requests for geographically-referenced data. This may include identification of an address location or file offset at which the desired parcel(s) of data are located on the medium. The indexes 66 may also be used to determine the location of desired data within each parcel.

As stated above, indexes become another rule in the rule base 406 and are matched against with no further mechanism. Indexes can be accommodated by adding logic statements to the rule base telling how to use the index as a term in a query.

The data retrieval routines 262 act as low level data access primitives. The data retrieval routines 262 in the index access layer 260 are generic, i.e., they are not specific to the database 42 or the indexes 66. Instead, the locations of the indexes 66 on the medium, the types of indexes, the types of data related by the index, the index keys, and so on, are specified by parameters included when the data retrieval routines 262 in the index access system 260 are called by the deductive database engine 200. The deductive database engine 200 formulates the parameters used when calling a data retrieval routine 262 in the index access system by reading and combining logic rules 300, as described above.

H. Physical to Logical Conversion

The physical to logical conversion system 280 is another part of the data access layer 39. The physical to logical conversion system 280 includes data retrieval routines 282 for converting the data from the format in which they are stored on the medium into a format in which the navigation applications can use them (e.g., the logical data model format). Like the data retrieval routines 262 in the index access system 260, the data retrieval routines 282 in the physical to logical conversion system 280 act as low level data access primitives. The data retrieval routines 282 in the physical to logical conversion system 280 are generic, i.e., they are not specific to the types of data in the database 42. Instead, the size of the records, the locations of the records, cross-referencing information, the type of de-compression and/or unpacking needed, and so on, are specified by parameters included when the data retrieval routines 282 are called by the deductive database engine 200. The deductive database engine 200 formulates the parameters used when calling a data retrieval routine 282 by reading and combining logic rules 300.

I. Cursors

The cursor management system 290 is part of the data access layer 39. Some requests for geographically-referenced data from the navigation applications 28 are expected to result in replies that include multiple data entities. For example, a request for all the cartographic data records representing roads within a specified bounding rectangular area may include hundreds of data records. The cursor management system 290 provides for handling replies to the navigation applications 28 that include multiple records.

In one embodiment of the deductive database engine, results are obtained and processed one at a time. A query of the data in the geographic database is performed by routines 262 in the index access management system 260 that are called by execution of logic rules 300 by the deductive database engine 200. A query may be performed on all or part of the data in the geographic database, as dictated by the logic rules that define the query. Within a set of data records, the first record in the set that satisfies the query is processed using the appropriate routines 282 in the physical-to-logical conversion system 280. Another logic rule executed by the deductive database engine performs a "GetNext" operation so that after the first record is found that satisfies a query, the query continues from that point forward in the set to find the next record in the set that satisfies the query, and so on, until no more records are found in the set that satisfy the query.

The cursor management system 290 performs buffering and gatekeeping functions. The cursor management system 290 handles a reply to the navigation applications 28 that involve multiple records. When a result set is large, the cursor management system 290 can temporarily suspend "GetNext" operations by the deductive database engine until the navigation applications can catch up. The cursor management system 290 can also temporarily store the multiple results in a memory buffer.

IV. Applications

A. Providing Updated Data

Figure 10:
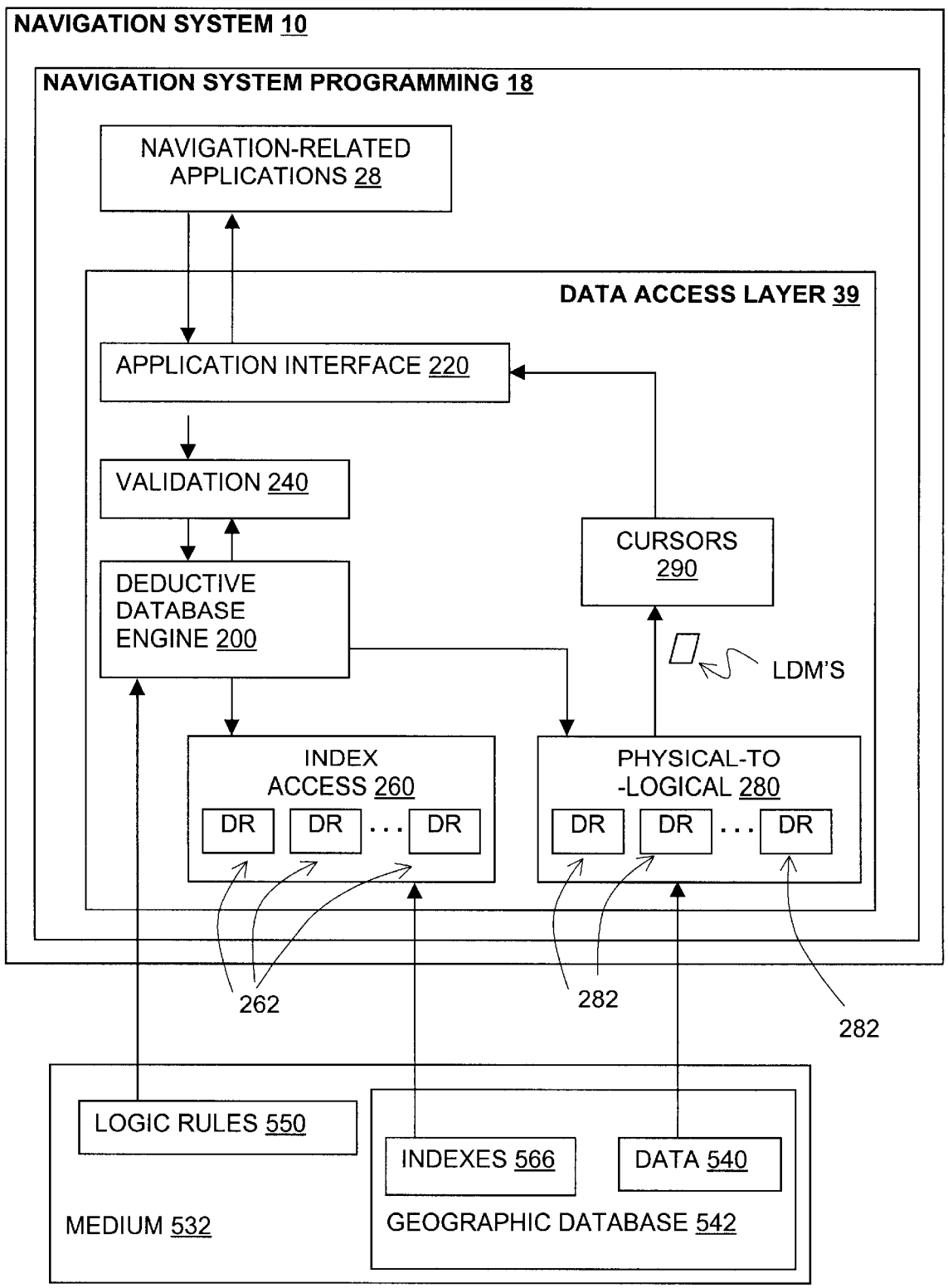
FIG. 10 is a block diagram illustrating use of the data access layer of FIG. 7 with updated geographic data.

FIG. 10 shows how a navigation system can be provided with new data. FIG. 10 shows the same navigation system 10 that had been described in connection with FIG. 1. The navigation system 10 includes navigation system programming 18 including the data access layer 39 with the deductive database engine 200, as described above in connection with FIGS. 7–9. In FIG. 10, the prior geographic database (e.g., 42 in FIG. 7) has been replaced with a new geographic database 542 (e.g., version 2.0). The new geographic database 542 is stored on a new medium 532, or alternatively, the new geographic database 542 may be stored on the old medium 32. The new geographic database 542 includes new geographic data 540. The new geographic data 540 relate to the same geographic coverage area as the prior geographic data 40. Alternatively, the new geographic data 540 may relate to a different geographic coverage area.

The new geographic database 542 may include new types of data. For example, whereas the prior version of the geographic database 42 included data indicating the phone numbers of points of interest, the new geographic database 542 also includes data indicating the fax numbers, email addresses and the web addresses of the points of interest. In addition, the new geographic database 542 also includes new indexes 566 that can be used to cross reference the old and new types of data (e.g., so that a point of interest can be found by its fax, email, and web addresses and vice versa).

Associated with the new geographic data 540 and indexes 566 in the new geographic database 542 are new logic rules 550. The new logic rules 542 are located on the same medium 532 as the new geographic database 542 or alternatively, the new logic rules 550 may be located on a different medium.

The new logic rules 550 have the same structure as the prior logic rules 300, described above. Each new logic rule includes a head and a body. Therefore, each new logic rule 550 can be processed in the same manner by the deductive database engine 200 as the prior logic rules 200. The new logic rules 550 relate to the data 540 and indexes 566 in the new database 540. Accordingly, the new logic rules 550 will account for the new types of data included in the new geographic database 542, new locations on the medium 532 at which data are stored, any new indexes that relate to either prior types of data or new types of data, and so on. For example, if the locations of point of interest data records on the medium have changed (e.g., because there are more point of interest data being stored), the new locations on the medium are specified by the logic rules 550. Thus, when the deductive database engine 200 is operated to obtain data for replying to a query for point of interest data, it will use the new logic rules to locate the point of interest data on the medium.

The new logic rules 550 also account for adding new tables. Adding a new table consists of adding the data for the table and adding the statements in the logic rules indicating how the table connects to existing data. The existing deductive database engine 200 accesses these new statements in the new logic rules when searching for data.

The deductive database engine 200 included in the data access layer 39 provides for forward compatibility. Navigation systems having a data access layer that includes a deductive database engine, as described herein, are able to access and use new releases of geographic databases that include both updated geographic data as well as new types of data. This provides an advantage that the same new, updated version of a geographic database can be provided and used in both new and old navigation systems.

The data access layer that includes the deductive database engine can also provide backward compatibility. With a deductive database engine in a data access layer, newer navigation systems can use older versions of geographic data. This provides an advantage that navigation system manufacturers can design systems that use new types of data before the data are available. These navigation systems could be run with currently available versions of a geographic database until new versions of the geographic database become available that include the new types of data. When new versions of the geographic databases with the new types of data become available, the new versions of the geographic database can be installed in the navigation systems which can then use the new types of data to provide new kinds of services.

B. Combining On-board and Off-board Data

Figure 11:
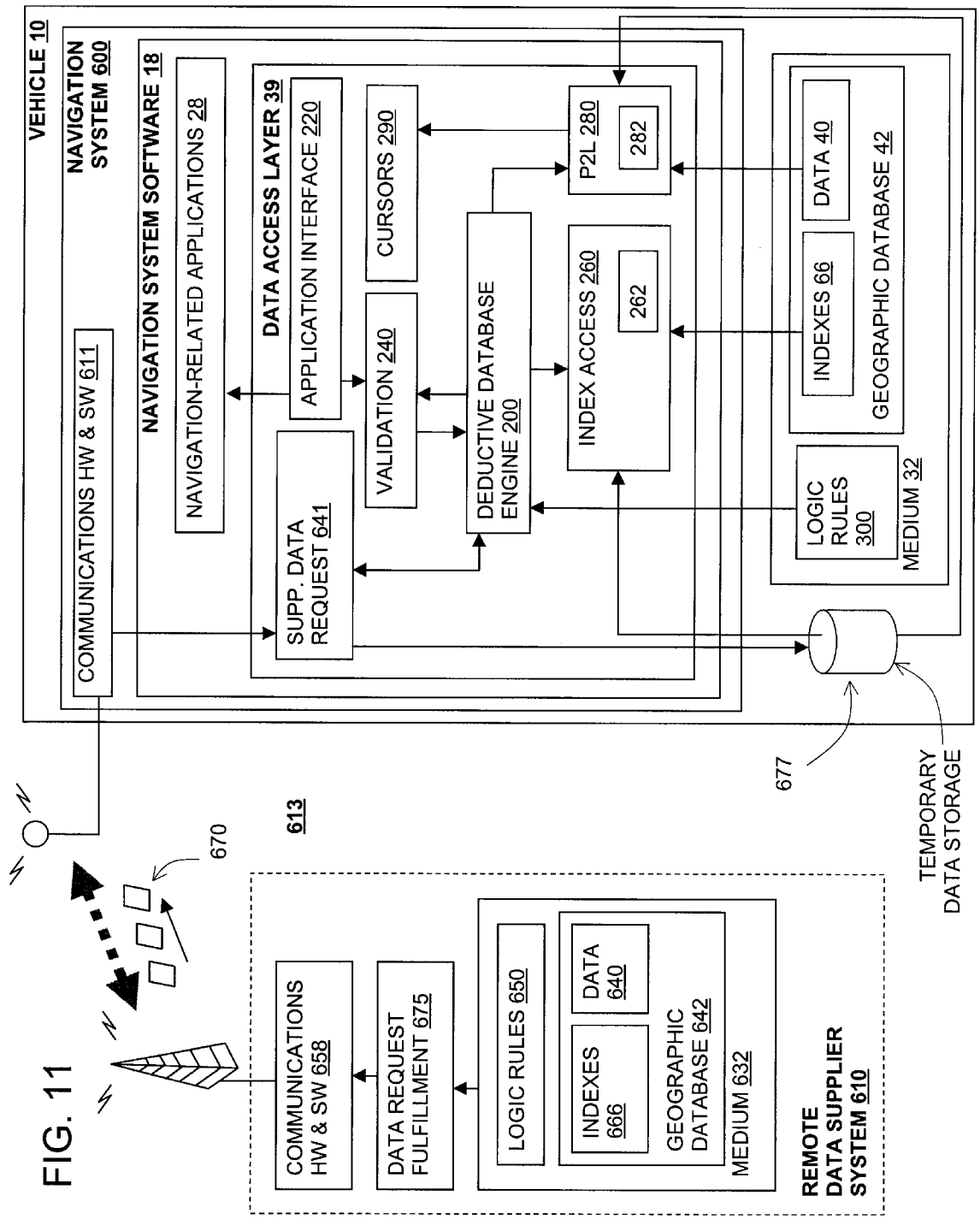
FIG. 11 is a block diagram illustrating use of the data access layer of FIG. 7 with additional data provided over a wireless communication link.

FIG. 11 shows a means that enables a vehicle navigation system to use a geographic database located on-board the vehicle in combination with additional data provided from an off-board data supplier. Accessing and using off-board data are enabled by logic rules that are processed by the deductive database engine located in the data access layer in the vehicle navigation system.

In FIG. 11, a vehicle navigation system 600 and a remote data supplier 610 are located in a geographic region 613. The region 613 may be a metropolitan area, a state, a province, country, or a combination of one or more metropolitan areas, states, countries and so on. In the system shown in FIG. 11, only a single vehicle and a single remote data supplier are shown although it is understood that many vehicles and many remote data suppliers may be present. The navigation system 600 in FIG. 11 is similar to the navigation system 10 described in connection with FIG. 1, wherein like components are identified by the same reference numbers. The navigation system 600 in FIG. 11 includes navigation system programming 18 including the data access layer 39 with the deductive database engine 200, as described above in connection with FIGS. 7–9. The navigation system 600 uses the geographic database 42 that includes data 40, indexes 66 and logic rules 300, as described above. The geographic database 42 is stored on the medium 32 which is located with the navigation system 600, e.g., installed locally with the navigation system 600 in the vehicle 10.

In FIG. 11, the navigation system 600 includes communications hardware and software 611, such as a receiver, transmitter, etc., by which the navigation system 600 can communicate with and exchange data wirelessly with the remote data supplier 610. Any type of wireless communications technology is suitable, including cellular, radio, satellite, PCS/GSM, and so on. In the embodiment of FIG. 11, the data access layer 39 includes a function 641 that provides a means by which the deductive database engine 200 can interface with the communications hardware and software 611 to send and receive data from the supplementary data supplier 610.

The supplementary data supplier 610 includes supplementary data 640. The supplementary data 640 are stored on a medium 632 at a location which is remote from the vehicle 10. The supplementary data supplier 610 also includes supplementary indexes 666 and supplementary logic rules 650. The supplementary indexes 666 and the supplementary logic rules 650 may be stored with the supplementary data 640 or may be stored elsewhere.

The supplementary data supplier 610 also includes communications hardware and software 658 by which the supplementary data supplier 610 and communicate and exchange data with the navigation system 600. The supplementary data supplier 610 also includes a data fulfillment program 675.

Methods by which the vehicle navigation system can access and use data provided by an off-board data supplier are described in the following examples.

EXAMPLE 1

Using the embodiment in FIG. 11, supplementary data that are not present locally in the vehicle can be made available to the navigation system in the vehicle so that navigation functions provided in the vehicle can take the supplementary data into account when providing navigation-related functions.

During operation of the navigation system 600, a logic rule 300 in the vehicle is executed that calls a routine in the supplementary data request program 641. This routine in the supplementary data request program 641 sends a request via the vehicle communications hardware and software 611 to determine whether supplementary data are available and, if they are, obtain the supplementary data. This logic rule is written so that it is processed upon start up and possibly from time-to-time while the vehicle is being operated.

In response to the request from the data request program 641, the remote data supplier 610 sends a reply. The reply from the remote data supplier 610 to the vehicle 10 includes logic rules 670. The downloaded logic rules 670 may include variables that are bound with logic rules 300 located on-board the vehicle for seamless integration of data. The downloaded logic rules 670 are stored locally in the vehicle in a temporary data storage device 677. The deductive database engine 200 located in the vehicle treats the downloaded logic rules 670 the same way as logic rules 300 already stored locally are treated. The downloaded logic rules 670 are added to the set of all rules (e.g., a rule base) that are executed by the deductive database engine 200. The downloaded logic rules 670 may be written so that they are executed first during processing of certain types of requests.

As an example, assume that the data 40 present locally in the vehicle 10 include listings for all the restaurants in a given geographic area. According to this example, the remote data supplier 610 has data available in the supplementary database 642 that lists business (including restaurants) that provide discounts to certain credit card holders. The user of the navigation system 600 wishes to search for restaurants located close to the current vehicle position that provide discounts to the credit card holders. The user inputs his/her request to the navigation system 600 via the user interface (shown in FIG. 1). A function in the navigation applications 28 calls the data access layer 39. When the deductive database engine 200 processes the logic rules to find restaurants, the downloaded logic rules are processed first indicating that data about discounts to credit card holders are available. The downloaded logic rules call a routine in the data request application 641 to obtain the data about the businesses of the type requested by the user (i.e., restaurants) close to the current location of the user that provide discounts to credit card holders. The request is transmitted via the communications equipment 611 in the vehicle 10 to the remote data supplier 610 where the data fulfillment program 675 obtains the data about the restaurants close to the location of the user that provide discounts to credit card users. These data are transmitted from the remote data supplier 610 to the end user's vehicle 10 via the communications equipment 658 and 611. These data are received in the vehicle 10 and stored in the temporary data storage 677. These downloaded data are accessed and used by the deductive database engine 200 using the logic rules 300 already available in the vehicle as well as the downloaded logic rules 670.

EXAMPLE 2

According to another example, an in-vehicle navigation system, such as the system 600 shown in FIG. 11, can obtain and use traffic-related data provided from an off-board data supplier. The traffic-related data can be provided in a similar manner as described in the previous example.

In the case of traffic-related data, the remote data supplier 620 obtains and provides data that pertain to traffic and road conditions in the region 613 in which the vehicle 10 is located. The remote data supplier 610 (or another entity) has equipment and programming for collecting, assembling, organizing, analyzing and formatting the traffic and road condition data. The traffic and road condition data are prepared in one or more appropriate predetermined formats. In one embodiment, the traffic-related data conforms to the standard format for ALERT-C messages established in the RDS-TMC system although alternative systems and/or protocols can be used.

In the case of traffic-related data, logic rules in the vehicle determine when to request that traffic-related data be obtained and what kind of traffic-related data to obtain. For example, logic rules in the vehicle may initiate a request for traffic-related data only when a navigation function is going to be performed that might be affected by traffic. For example, when a user requests that a route be calculated to a specified location, a logic rule initiates a request for traffic-related data so that the route calculation function (33 in FIG. 2) determines the fastest route taking into account the most up-to-date data about traffic conditions. According to an alternative method of operation, a logic rule in the vehicle may initiate requests for updated traffic-related data periodically and store the traffic-related data in the temporary data storage 677 so that the data are available immediately when needed.

The logic rules in the vehicle call the appropriate routines to convert the downloaded traffic data into a format in which they can be used by the navigation applications 28. The routines for converting the downloaded traffic data may be included in the physical-to-logical system 280 or another system that provides this function. The routines may be downloaded from the data supplier 610 if necessary.

Logic rules may also be executed so that up-to-date traffic data are obtained periodically during the operation of some types of navigation-related functions. For example, while a user is being provided with route guidance instructions for reaching a desired destination, a logic rule may request and obtain updated traffic data related to the route being followed. If traffic congestion develops after the route is begun, an alternative route may be determined, if appropriate.

Downloading this data access logic is facilitated because the logic statements are small. Then, requests that require combining the data (e.g., select segments in Chicago with traffic delays less than a certain amount) select the appropriate reporting service and download just the data that are necessary to answer the query.

EXAMPLE 3

When off-board data are made available to a vehicle navigation system, such as in the examples described above, logic rules can be used to determine how the on-board data and the off-board data will be used together. As an example, logic rules can provide that additional processing be performed using data available locally (i.e., in the vehicle) in order to reduce the amount of data that has to be downloaded from the remote data source. Logic rules that alter the order of searches may be present already in the vehicle (e.g., the logic rules 300 in FIG. 11) or may be among logic rules that are downloaded from the remote data provider 610 in order to make the remote data available to the vehicle user.

EXAMPLE 4

Another example relates to determining border crossings within a specified rectangle. Using prior methods, one could look for all POI's within the rectangle and filter for border crossings or one could filter for border crossings and then filter by rectangle. According to another prior method, one could first use the rectangle to select border polylines and stop the search if none were found. With an embodiment of a deductive database, these options are expressed by re-writing rules that transform a query from the user's statement to an executable set of steps that access the data tables. In this example, if the rectangle index was local and the POI type data was remote, there would be a rule that would say in effect "if you access a table 1 and use the results to access a table 2 and table 1 is remote, then rewrite the query to access table 2 and use the results to access table 1" and this rule would modify all applicable queries including the one's searching for POI's As illustrated by the examples provided above, the deductive database engine provides support for off-board data selection based on on-board computations.

C. Integrating Data of Other Data Providers

In connection with FIG. 11, it was described how a navigation system in a vehicle combines and uses off-board data and on-board data. A navigation system can also use a deductive database architecture to combine geographic data with additional data located in the vehicle. These additional data may be located on a separate medium in the vehicle or alternatively, these additional data may be located on the same medium as the geographic data. These additional types of data may relate to special enhanced features. For example, the additional types of data may relate to restaurant ratings, video clips tourist attractions, and so on.

Figure 12:
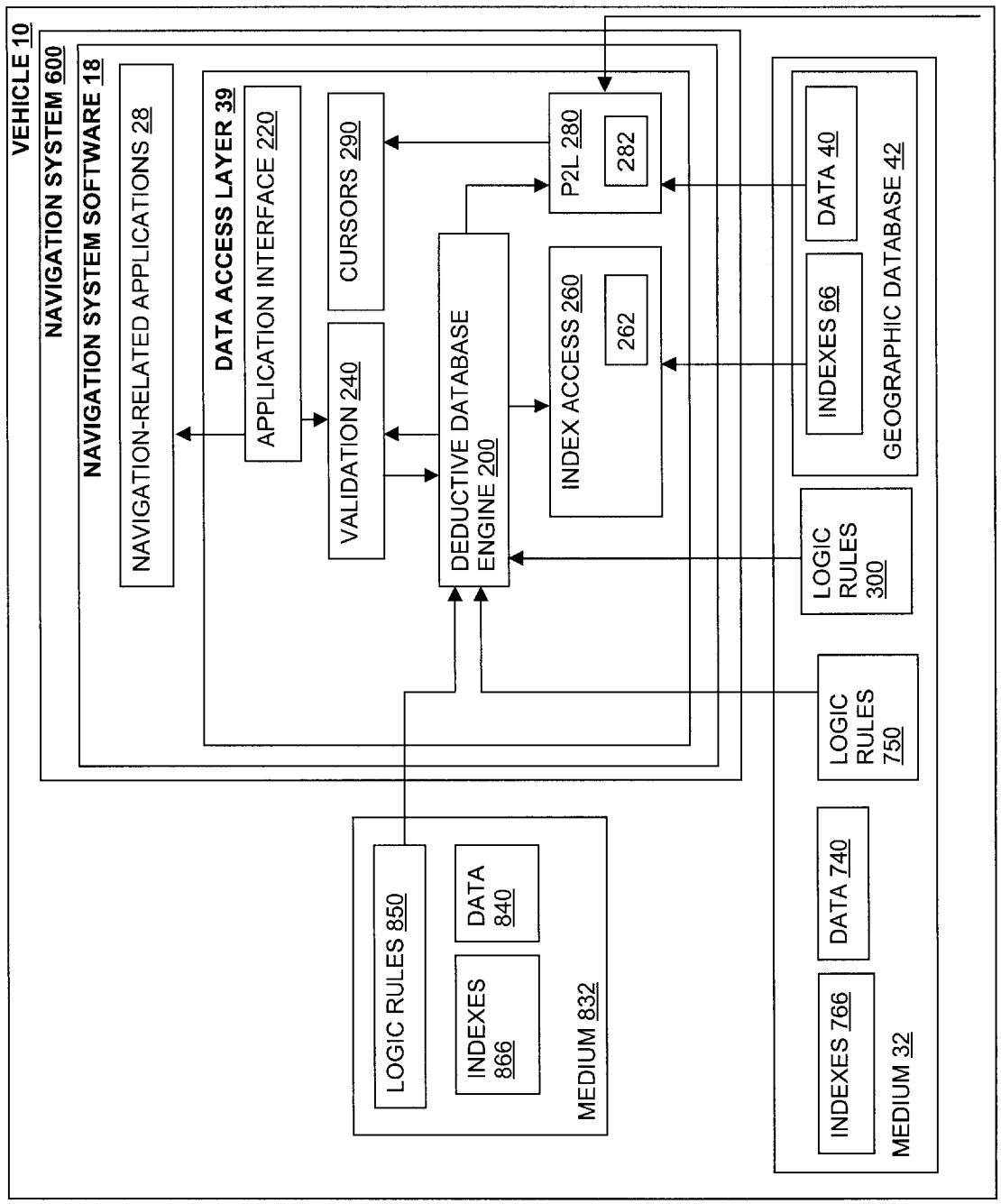
FIG. 12 is a block diagram illustrating use of the data access layer of FIG. 7 with additional data located on-board the vehicle.

FIG. 12 shows a diagram of the vehicle navigation system 10. The navigation system 600 in FIG. 12 is similar to the navigation system 10 described in connection with FIG. 1. The navigation system 10 uses geographic data 40, a first type of supplementary data 740 and a second type of supplementary data 840. The first type of supplementary data 740 is located on the same medium 32 as the geographic data 40. The second type of supplementary data 840 is located on the second medium 832. Associated with the first type of supplementary data 740 are indexes 766 and logic rules 750. Associated with the second type of supplementary data 840 are indexes 866 and logic rules 850.

The deductive database engine 200 in the vehicle 10 reads and uses the logic rules 300, 750, and 850 to access and use the geographic data 40 and the additional types of data 740 and 840. The logic rules determine how to relate the additional data 750 and 850 with the geographic data 40.

D. Navigation Applications on Personal Computers and PDA's

In the embodiments disclosed above, the data access layer including a deductive database engine that used logic rules associated with a geographic database was described as being part of a navigation system. A data access layer including a deductive database engine that uses logic rules can be installed and/or used on various different kinds of platforms, including workstations, personal computers, personal digital assistants, networks, pagers, televisions, radio receivers, telephones, and so on.

E. Navigation Systems Configuration

Different navigation systems have different hardware resources, e.g., more or less memory, faster or slower processors, etc. The hardware resources of a navigation system may affect how a navigation system uses geographic data. For example, a navigation system may have a relatively large amount of memory, but a slow processor. With such a navigation system, software processes and algorithms that involve caching larger amounts of data may provide better performance over processes and algorithms that involve more calculation. Logic rules can be used to tune and configure how the software in the data access layer of a navigation system uses geographic in order to take into account the hardware resources of the navigation system. For example, if a navigation system includes more memory resources, processes that cache more data are used.

The logic rules that take into account the hardware resources of a navigation system may be included in a separate memory (e.g., a ROM) that is part of the navigation system. The logic rules in the separate memory are used by the deductive database in a similar manner as the logic rules provided by a separate data supplier (e.g., the remote data supplier 610 of FIG. 11). The deductive database engine reads and uses the logic rules from the separate memory to call a routine or change a state that affects how certain data access functions are performed.

In an alternative embodiment, the logic rules that take into account the hardware resources of the navigation system may be included among the logic rules stored with the geographic database. If the logic rules that take into account the hardware resources of the navigation system are included among the logic rules stored with the geographic database, they call routines in the data access layer that query the hardware of the navigation system in order to determine what resources are available. Based on the responses to these queries, the available hardware resources of the navigation system are taken into account when performing data access functions. Using logic rules and a deductive database engine, a data access layer can be automatically configured for the navigation system in which it is installed (e.g., plug-and-play configuration). In addition, when new hardware resources are added, e.g., more memory, the routines called by the logic rules automatically detect the new hardware and modify the data access functions accordingly.

Extending this concept further, logic rules used by a deductive database engine can also be used for porting the data access layer to different hardware platforms.

V. ADVANTAGES

As mentioned above, a data access layer that includes the deductive database engine can provide for forward and backward compatibility and also can be used on different hardware platforms to enable the same geographic database to be used interchangeably on these different platforms.

An advantage of the disclosed embodiments is that navigation systems can use any type of geographic database. The data access layer uses the logic rules associated with a database to formulate the query routines that are used to access, read and use the data contained in the database, including any indexes used with the database. Because the data access layer uses the logic rules associated with the database to formulate the means by which the database is accessed, there are not necessarily any fixed data types (from the standpoint of the navigation system).

One advantage that follows from the foregoing is that geographic data can be parcelized without restricting the parcelization technique. The logic rules can be used to indicate which parcel to retrieve so that only the appropriate data are accessed. Another advantage is that a new data type or table can readily be added. To add a new data type or table, new logic rules that refer to the new data type or table are associated with the database.

Another advantage is that operation of the deductive database engine can be adapted to parallel processing. Processing of logic statements can be done in parallel (unless there are specific dependencies) with the results of parallel operations combined as needed. For example, a data retrieval process can be formulated in which all the parcels containing the data needed to respond to a query are retrieved first and then, if more than one parcel is retrieved, parallel operations are performed on each parcel. Then, after all the parallel operations are performed, the results are combined.

The embodiments described above provide particular advantages for a database that forms an embedded part of a system. A geographic database used in a navigation system is an example of such a system. Use of the deductive database engine in the disclosed embodiments is advantageous because it allows abstracting away low level details (e.g., row access, index navigation, etc.) but allows control over elements like schema generation, cache management, transaction support, stored procedures, trigger support, security, and optimized SQL execution.

The embodiments described above also facilitate integration of third party data.

The embodiments described may also provide easier software and database. maintenance.

It is intended that the foregoing detailed description be regarded as illustrative rather than limiting and that it is understood that the following claims including all equivalents are intended to define the scope of the invention.

I claim:

1. A database architecture for a navigation system comprising:
   a geographic database including geographic data and a plurality of indexes into the geographic data;
   data access programming that accepts requests for geographically-referenced data, accesses the geographic data from a medium upon which the geographic data are stored and provides responses to the requests for geographically-referenced data;
   logic rules associated with the geographic database, wherein each of said logic rules comprises a first part specifying a condition and a second part specifying an action; and
   a deductive database engine associated with the data access programming, wherein said deductive database engine accesses and combines said logic rules to determine which of said indexes to use to determine which geographic data to access from the medium.

2. A database architecture for a navigation system comprising:
   a geographic database including geographic data stored on a medium in a first format;
   data access programming that accepts requests for geographically-referenced data to be provided in a second format, accesses the geographic data from the medium, converts the geographic data from the first format into the second format, and provides responses to the requests for geographically-referenced data;
   logic rules associated with the geographic database, wherein each of said logic rules comprises a first part specifying a condition and a second part specifying an action; and
   a deductive database engine associated with the data access programming, wherein said deductive database engine accesses and combines said logic rules to determine how to convert the geographic data from the first format to the second format.

3. The invention of claim 1 wherein the geographic data are stored on the medium in a first format and wherein the responses to requests for geographically-referenced data are to be provided in a second format, and wherein said deductive database engine accesses and combines said logic rules to determine how to convert the geographic data from the first format to the second format.

4. The invention of claim 1 wherein said data access programming further comprises:
   an index access system that includes data retrieval routines that are called by said logic rules, wherein said data retrieval routines access said indexes.

5. The invention of claim 2 wherein said data access programming further comprises:
   a physical-to-logical conversion system that includes data retrieval routines that are called by logic rules to convert geographic data from said first format into said second format.

6. The invention of claim 1 or 2 wherein said deductive database engine determines which of the logic rules have first parts that are satisfied, determines which one of the logic rules that have first parts that are satisfied should be executed first, and executes the action specified in the second part of the logic rule determined to be executed first.

7. The invention of claim 1 or 2 wherein said second part indicates one of a programming routine and a change of state.

8. The invention of claim 1 or 2 wherein said condition comprises one of an intrinsic condition relating to said geographic data and an extrinsic condition relating to a state previously determined by the deductive database engine.

9. The invention of claim 1 or 2 further comprising remotely-located data and wherein said logic rules include logic rules that provide access to said remotely-located data when available.

10. The invention of claim 1 or 2 further wherein said geographic database comprises updated data and wherein said logic rules include logic rules that provide access to said updated data.

11. A method of operation for accessing a geographic database comprising:
    accepting a request for navigation-related data;
    accessing a geographic database stored on a medium;
    obtaining data from said geographic database;
    using said data obtained from said geographic database to provide a reply to said request;
    wherein said steps of accessing, obtaining and using comprise repeatedly performing the steps of:
        accessing logic rules associated with the geographic database;
        determining which of said logic rules are satisfied;
        determining which of said logic rules that are satisfied has a highest priority; and
        executing an action specified by the logic rule determined to have the highest priority, until all the data needed to provide said reply have been obtained from said geographic database and a reply has been provided to said request.

12. An improved database architecture for a navigation system,
    wherein the database architecture comprises a geographic database including geographic data and a plurality of indexes into the geographic data, and further
    wherein the database architecture includes data access programming that accepts requests for geographically-referenced data, accesses the geographic data from a medium upon which the geographic data are stored and provides responses to the requests for geographically-referenced data,
    wherein the improvement comprises:
        logic rules associated with the geographic database, wherein each of said logic rules comprises a first part specifying a condition and a second part specifying an action; and
        a deductive database engine included in the data access programming, wherein said deductive database engine accesses and combines said logic rules to determine which of said indexes to use to determine which geographic data to access from the medium.

13. The invention of claim 12 wherein said deductive database engine determines which of the logic rules have first parts that are satisfied, determines which one of the logic rules that have first parts that are satisfied should be executed first, and executes the action specified in the second part of the logic rule determined to be executed first.

14. The invention of claim 12 wherein said second part indicates one of a programming routine and a change of state.

15. The invention of claim 12 wherein said condition comprises one of an intrinsic condition relating to said geographic data and an extrinsic condition relating to a state previously determined by the deductive database engine.

16. An improved database architecture for a navigation system, wherein the database architecture comprises a geographic database including geographic data stored on a medium in a first format, and further wherein the database architecture includes data access programming that accepts requests for geographically-referenced data to be provided in a second format, accesses the geographic data from the medium, converts the geographic data from the first format into the second format, and provides responses to the requests for geographically-referenced data, wherein the improvement comprises:

logic rules associated with the geographic database, wherein each of said logic rules comprises a first part specifying a condition and a second part specifying an action; and a deductive database engine included in the data access programming, wherein said deductive database engine accesses and combines said logic rules to determine how to convert the geographic data from the first format to the second format.

17. The invention of claim 16 wherein said deductive database engine determines which of the logic rules have first parts that are satisfied, determines which one of the logic rules that have first parts that are satisfied should be executed first, and executes the action specified in the second part of the logic rule determined to be executed first.

18. The invention of claim 16 wherein said second part indicates one of a programming routine and a change of state.

19. The invention of claim 16 wherein said condition comprises one of an intrinsic condition relating to said geographic data and an extrinsic condition relating to a state previously determined by the deductive database engine.

* * * * *